US012665809B2

(12) United States Patent
Gupta et al.

(10) Patent No.: US 12,665,809 B2
(45) Date of Patent: Jun. 23, 2026

(54) MANAGING ANOMALOUS NETWORK TELEMETRY MESSAGE FLOWS

(71) Applicant: Hewlett Packard Enterprise Development LP, Spring, TX (US)

(72) Inventors: Gopal Gupta, Bangalore (IN); Satishwar Chandrashekar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 220 days.

(21) Appl. No.: 18/586,783

(22) Filed: Feb. 26, 2024

(65) Prior Publication Data

US 2025/0141738 A1 May 1, 2025

(30) Foreign Application Priority Data

Oct. 25, 2023 (IN) .............................. 202311072704

(51) Int. Cl.
H04L 41/0816 (2022.01)
H04L 43/026 (2022.01)
(52) U.S. Cl.
CPC ........ H04L 41/0816 (2013.01); H04L 43/026 (2013.01)
(58) Field of Classification Search
CPC .............. H04L 41/0816; H04L 43/026; H04L 43/0894; H04L 43/16; H04L 41/0896; H04L 41/06; H04L 47/25
See application file for complete search history.

(56) References Cited

U.S. PATENT DOCUMENTS

| | | | |
|---|---|---|---|
| 8,918,473 B1 * | 12/2014 | O'Connor ............ | G06Q 10/107 709/206 |
| 10,164,891 B2 | 12/2018 | Stanwood et al. | |
| 10,397,228 B2 | 8/2019 | Dubman et al. | |
| 10,574,512 B1 * | 2/2020 | Mermoud ................ | G06N 3/08 |
| 2020/0162371 A1 * | 5/2020 | Musku .................... | H04L 45/04 |
| 2021/0306372 A1 * | 9/2021 | Koral .................. | H04L 63/1458 |

(Continued)

OTHER PUBLICATIONS

Juniper Networks, "On-Box Aggregati on Overview", Jun. 15, 2023, 3 pages.

(Continued)

*Primary Examiner* — El Hadji M Sall
(74) *Attorney, Agent, or Firm* — Hewlett Packard Enterprise Patent Department

(57) ABSTRACT

A process includes monitoring a plurality of message flows sent by respective network devices of a plurality of network devices. The plurality of message flows is associated with reporting a network telemetry metric to a network management system. The process includes determining that a given message flow of the plurality of message flows exhibits an unexpected behavior. The process includes, responsive to determining that the given message flow exhibits the unexpected behavior, determining an aggregate available bandwidth for message flows of the plurality of message flows, which respectively exhibit expected behaviors. The process includes, responsive to determining that the given message flow exhibits the unexpected behavior, modifying a bandwidth of the given message flow based on the aggregate available bandwidth.

11 Claims, 7 Drawing Sheets

(56) References Cited

U.S. PATENT DOCUMENTS

| | | | |
|---|---|---|---|
| 2022/0278912 A1 | 9/2022 | Song et al. | |
| 2023/0139774 A1* | 5/2023 | Raiciu | H04L 43/0876 |
| | | | 709/238 |

OTHER PUBLICATIONS

Juniper Networks, "Subscribing to Telemetry Data Using gNMI", Jun. 15, 2023, 6 pages.
Wu et al., "Adaptive Subscription to YANG Notification", NETCONF Working Group, May 2022, 23 pages.

* cited by examiner

500

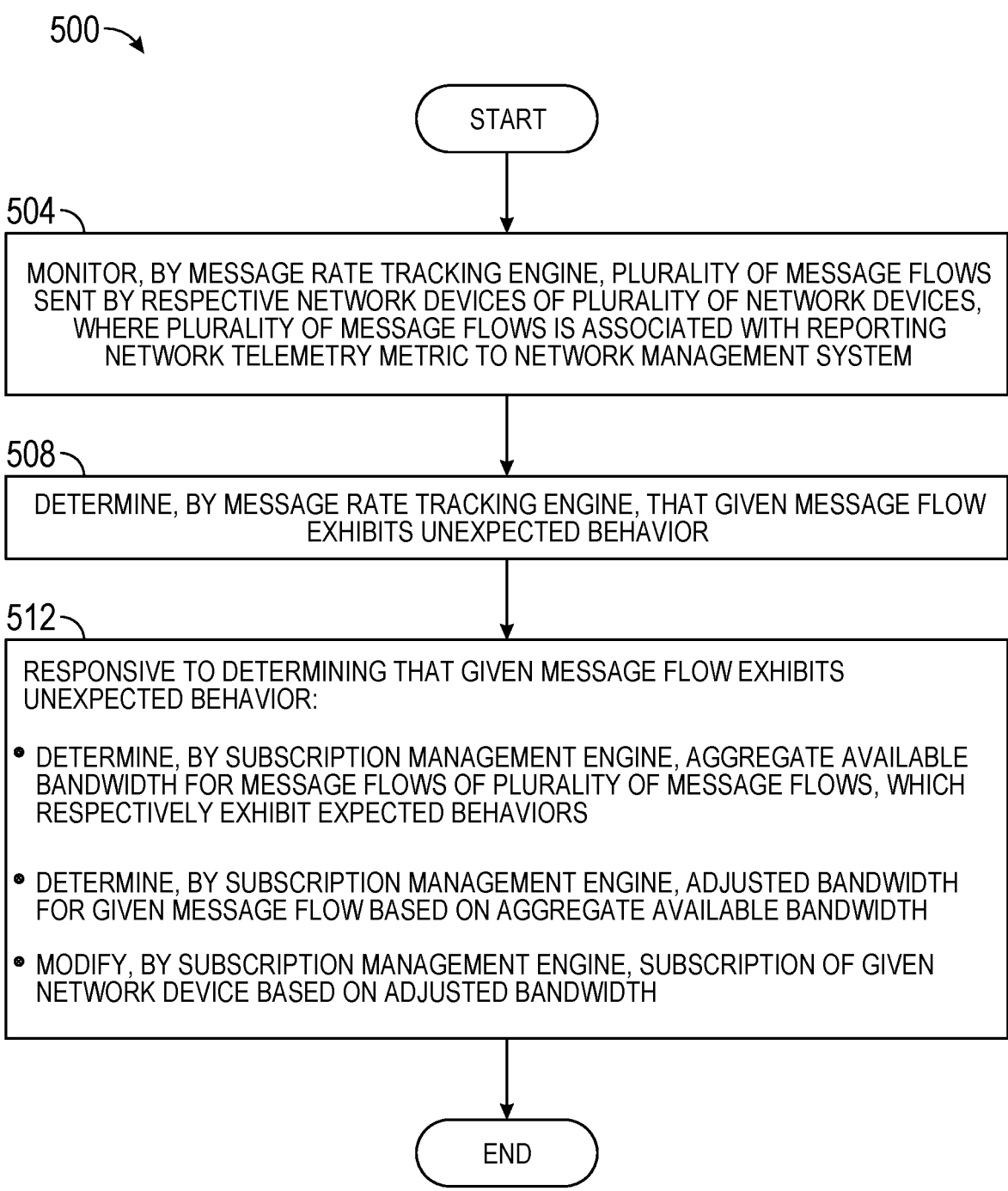

START

504

MONITOR, BY MESSAGE RATE TRACKING ENGINE, PLURALITY OF MESSAGE FLOWS SENT BY RESPECTIVE NETWORK DEVICES OF PLURALITY OF NETWORK DEVICES, WHERE PLURALITY OF MESSAGE FLOWS IS ASSOCIATED WITH REPORTING NETWORK TELEMETRY METRIC TO NETWORK MANAGEMENT SYSTEM

508

DETERMINE, BY MESSAGE RATE TRACKING ENGINE, THAT GIVEN MESSAGE FLOW EXHIBITS UNEXPECTED BEHAVIOR

512

RESPONSIVE TO DETERMINING THAT GIVEN MESSAGE FLOW EXHIBITS UNEXPECTED BEHAVIOR:

• DETERMINE, BY SUBSCRIPTION MANAGEMENT ENGINE, AGGREGATE AVAILABLE BANDWIDTH FOR MESSAGE FLOWS OF PLURALITY OF MESSAGE FLOWS, WHICH RESPECTIVELY EXHIBIT EXPECTED BEHAVIORS

• DETERMINE, BY SUBSCRIPTION MANAGEMENT ENGINE, ADJUSTED BANDWIDTH FOR GIVEN MESSAGE FLOW BASED ON AGGREGATE AVAILABLE BANDWIDTH

• MODIFY, BY SUBSCRIPTION MANAGEMENT ENGINE, SUBSCRIPTION OF GIVEN NETWORK DEVICE BASED ON ADJUSTED BANDWIDTH

END

Figure 6:
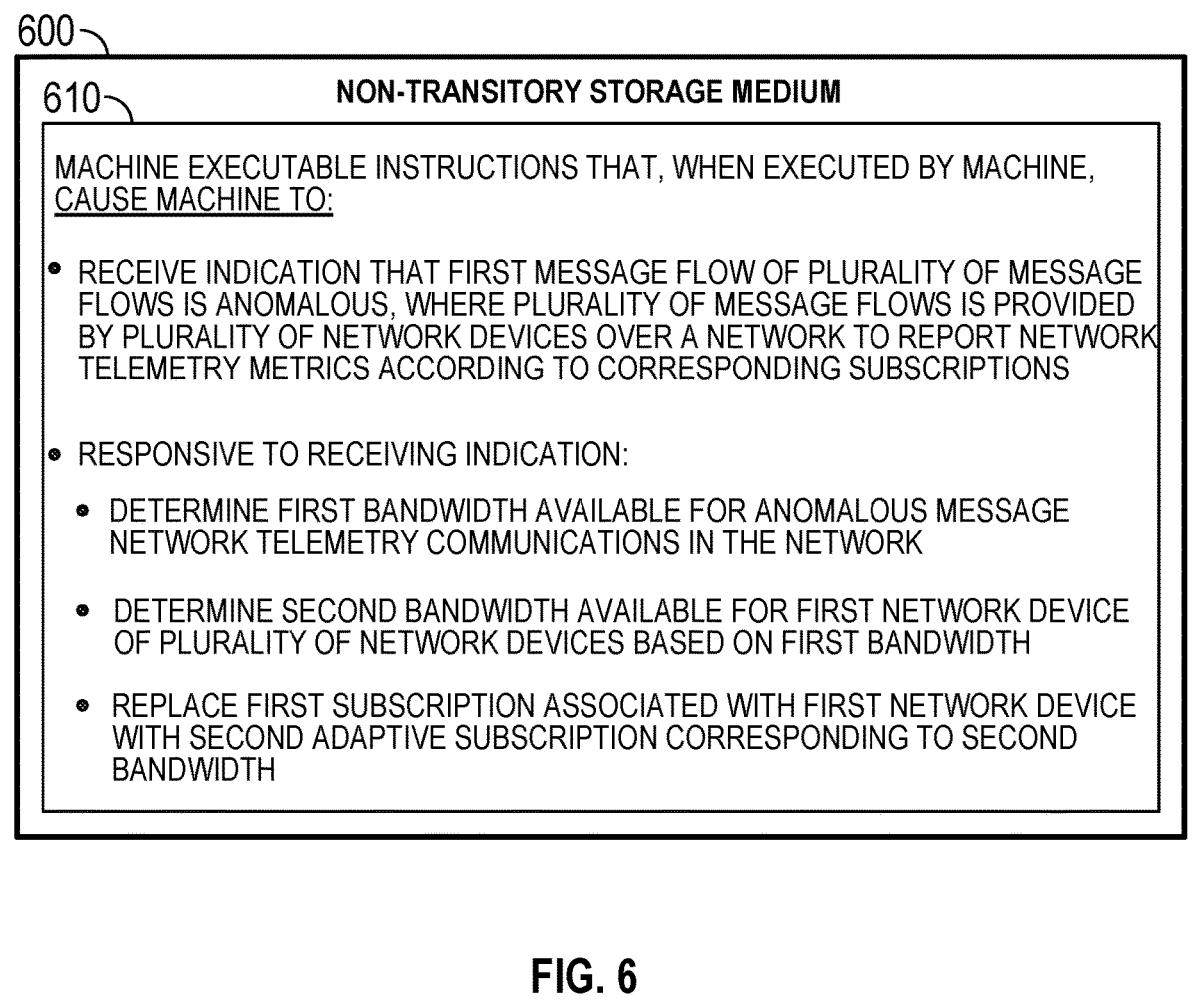

NON-TRANSITORY STORAGE MEDIUM

MACHINE EXECUTABLE INSTRUCTIONS THAT, WHEN EXECUTED BY MACHINE, CAUSE MACHINE TO:

- RECEIVE INDICATION THAT FIRST MESSAGE FLOW OF PLURALITY OF MESSAGE FLOWS IS ANOMALOUS, WHERE PLURALITY OF MESSAGE FLOWS IS PROVIDED BY PLURALITY OF NETWORK DEVICES OVER A NETWORK TO REPORT NETWORK TELEMETRY METRICS ACCORDING TO CORRESPONDING SUBSCRIPTIONS

- RESPONSIVE TO RECEIVING INDICATION:
  - DETERMINE FIRST BANDWIDTH AVAILABLE FOR ANOMALOUS MESSAGE NETWORK TELEMETRY COMMUNICATIONS IN THE NETWORK

- DETERMINE SECOND BANDWIDTH AVAILABLE FOR FIRST NETWORK DEVICE OF PLURALITY OF NETWORK DEVICES BASED ON FIRST BANDWIDTH

- REPLACE FIRST SUBSCRIPTION ASSOCIATED WITH FIRST NETWORK DEVICE WITH SECOND ADAPTIVE SUBSCRIPTION CORRESPONDING TO SECOND BANDWIDTH

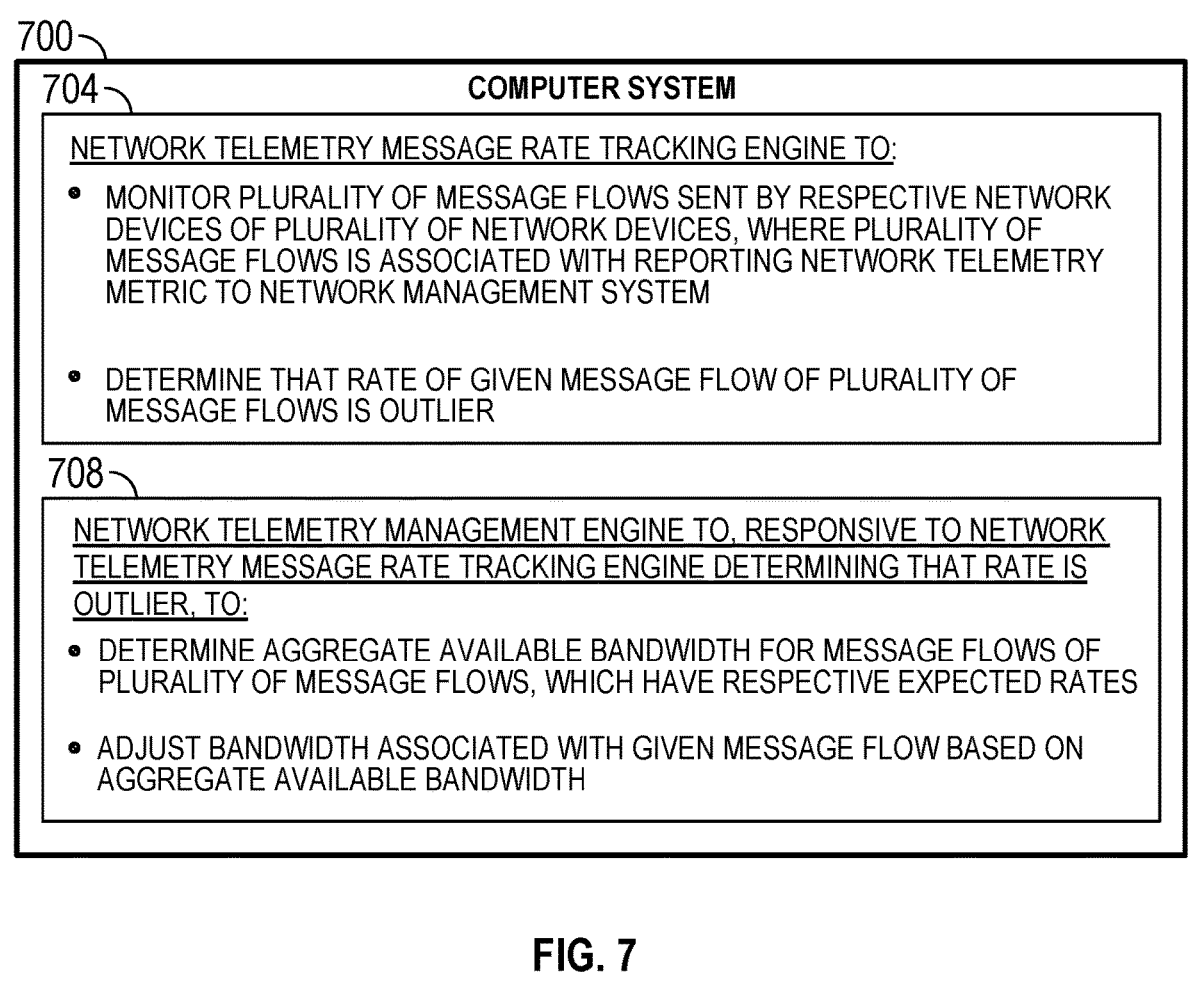

COMPUTER SYSTEM

704

<u>NETWORK TELEMETRY MESSAGE RATE TRACKING ENGINE TO:</u>

- MONITOR PLURALITY OF MESSAGE FLOWS SENT BY RESPECTIVE NETWORK DEVICES OF PLURALITY OF NETWORK DEVICES, WHERE PLURALITY OF MESSAGE FLOWS IS ASSOCIATED WITH REPORTING NETWORK TELEMETRY METRIC TO NETWORK MANAGEMENT SYSTEM

- DETERMINE THAT RATE OF GIVEN MESSAGE FLOW OF PLURALITY OF MESSAGE FLOWS IS OUTLIER

708

<u>NETWORK TELEMETRY MANAGEMENT ENGINE TO, RESPONSIVE TO NETWORK TELEMETRY MESSAGE RATE TRACKING ENGINE DETERMINING THAT RATE IS OUTLIER, TO:</u>

- DETERMINE AGGREGATE AVAILABLE BANDWIDTH FOR MESSAGE FLOWS OF PLURALITY OF MESSAGE FLOWS, WHICH HAVE RESPECTIVE EXPECTED RATES

- ADJUST BANDWIDTH ASSOCIATED WITH GIVEN MESSAGE FLOW BASED ON AGGREGATE AVAILABLE BANDWIDTH

FIG. 7

MANAGING ANOMALOUS NETWORK TELEMETRY MESSAGE FLOWS

BACKGROUND

An enterprise may use a cloud-based network management system to collect, log, visualize and analyze network telemetry metrics. The analyses of network telemetry metrics may be beneficial for a number of purposes, such as identifying network configuration problems, identifying network performance issues, detecting network device failures, recognizing security vulnerabilities and detecting security attacks.

BRIEF DESCRIPTION OF THE DRAWINGS

FIG. 5 is a flow diagram depicting a process to manage a network telemetry message flow that exhibits an unexpected behavior according to an example implementation.

FIG. 6 is an illustration of machine-readable instructions that, when executed by a machine, cause the machine to manage an anomalous message flow according to an example implementation.

FIG. 7 is a block diagram of a system to manage a message flow that has a rate that is an outlier according to an example implementation.

DETAILED DESCRIPTION

Figure 1:
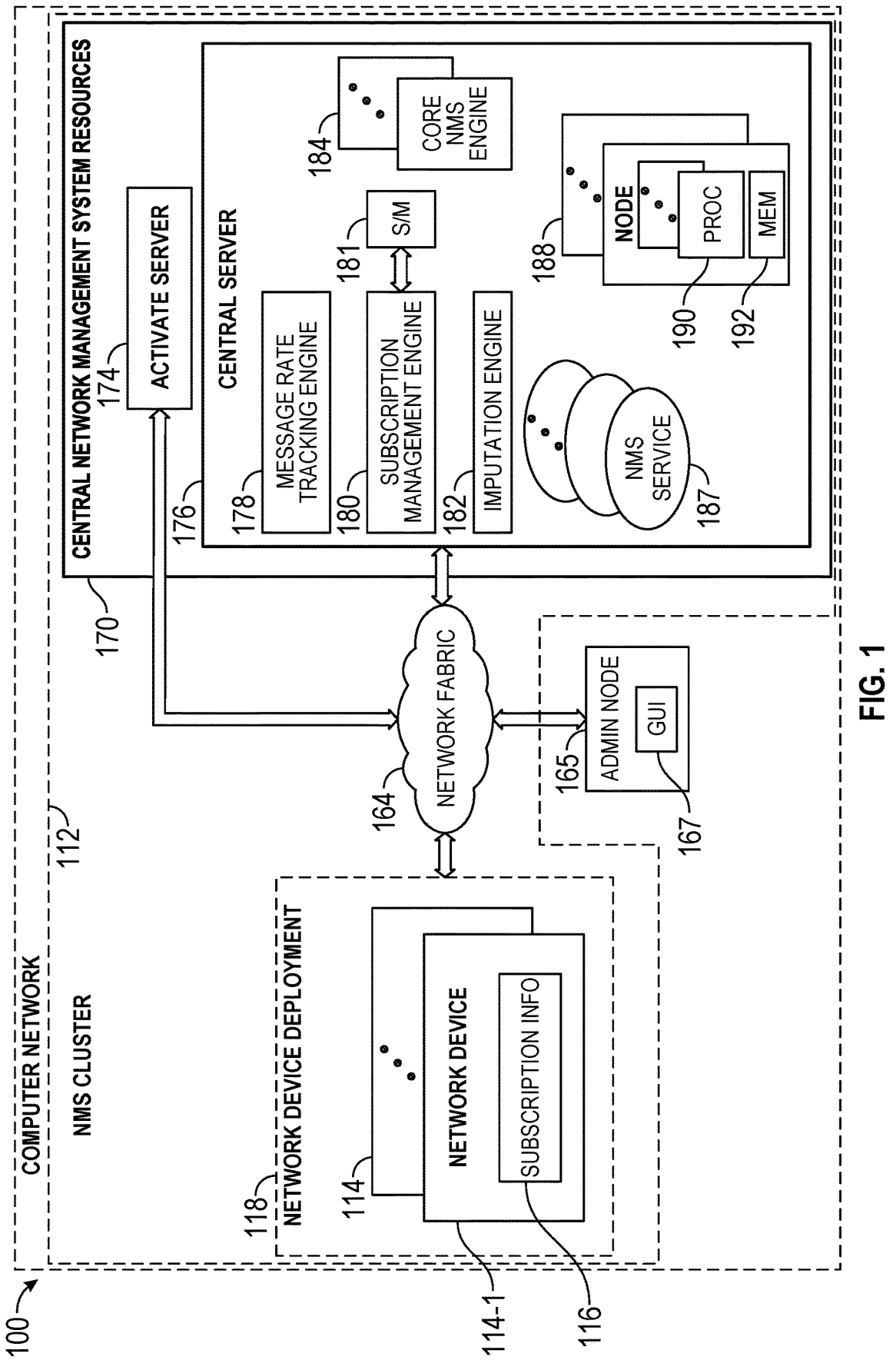
FIG. 1 is a block diagram of a computer network having a central network management system (NMS) cluster that manages anomalous network telemetry message flows according to an example implementation.

A network management system (NMS) cluster may include central NMS components (e.g., cloud-based components) that manage network devices (also referred to as "managed network devices" herein) of a particular network device deployment. In an example, a network device deployment may include a collection of network devices that are associated with a particular geographical location. For example, a particular NMS cluster may include a network device deployment, which includes network devices that are located in one or multiple branch networks that are at the same campus, same datacenter or within the same country.

The central NMS components may include a central server, and the managed network devices may generate and send messages (called "network telemetry messages" herein) to the central server. The messages may contain information about network telemetry metrics, and a particular network device may publish information about a particular network metric in a sequence of messages called a "network telemetry message flow." In general, network telemetry message flows may provide information about network telemetry metrics from which an insight about a state of a network may be directly or indirectly determined. Here, the "state of a network" refers to one or multiple characteristics of a network device (e.g., a network switch, router or gateway) that forms the network fabric, a portion of the network fabric (e.g., a particular subnet) or a client device that is connected to the network fabric.

Abnormal scenarios may cause one or multiple network devices to produce abnormally large rates of network telemetry messages, which may overwhelm the telemetry communication network. In accordance with example implementations, a central server of an NMS cluster detects unexpected, or anomalous, network telemetry message flows and undertakes message throttling measures to restrict the bandwidths of the respective anomalous message flows. In an example, the central server may replace a push model-based subscription for an anomalous network telemetry message flow with an adaptive subscription that constrains the bandwidth of the message flow (as compared to the base subscription). In examples, the adaptive subscription may increase a hint interval (for a periodic subscription) or restrict the times at which the network device may provide messages (for an on-change subscription). In another example, the central server may, for an anomalous network telemetry flow message flow that is controlled by polling, increase a polling interval. The central server may, in accordance with example implementations, determine that a particular network telemetry message flow is anomalous based on a message rate of the message flow. In accordance with example implementations, the central server may compare a message rate of a particular network telemetry message flow to one or multiple local message rate baselines and/or one or multiple global message rate baselines for purposes of determining whether the message flow is anomalous.

In an example, a network telemetry metric may represent the occurrence of a particular event (e.g., a network disassociation or a network association). In another example, a network telemetry metric may be a particular statistic (e.g., an ingress bandwidth of a network device associated with a particular virtual local area network (VLAN) or an egress bandwidth associated with a particular class of network traffic). In another example, a network telemetry metric may be an event log. In another example, a network telemetry metric may be a trace.

A managed network device may publish information about a certain network telemetry metric according to a subscription. A subscription corresponds to a push-based telemetry reporting model, in that the network device initiates the publication of the network telemetry metric information, as compared to the network device being polled (according to a pull-based network telemetry reporting model) for the network telemetry metric information. More specifically, a network device may publish information about a particular network telemetry metric according to parameters of a subscription. The parameters correspond to details about the covered network telemetry metric and the manner in which the publication occurs. In an example, a subscription may identify a particular network telemetry metric, define when the particular network device (the publisher) publishes information about the network telemetry metric and specify one or multiple recipients (the subscribers) for the published information.

In an example, a subscription may identify a single network telemetry metric. In another example, a subscription may identify multiple network telemetry metrics and therefore cover multiple network telemetry metrics. In another example, a subscription may identify a tree structure of network telemetry metrics. In an example, a subscription may specify a content format of the publications that are generated by the network device. The publications may be in the form of network telemetry messages that the network device generates and sends to the recipient device(s).

A sequence of network telemetry messages that is provided by a network device is referred to herein as a "network telemetry message flow." In an example, a network device may produce a network telemetry message flow in accordance with information (called "subscription information" herein) that is stored in the network device and defines aspects of a subscription. In another example, instead of generating a network telemetry message flow responsive to a subscription, a network device may produce a network telemetry message flow responsive to the network device being polled by the central server for network telemetry information.

A subscription may be an on-change subscription or a periodic subscription. For an on-change subscription, when a change in a network telemetry metric covered by the subscription changes, the network device immediately publishes the change (e.g., sends a message that contains content representing the change). For a periodic subscription, the network device may publish changes about a covered telemetry metric pursuant to a periodic schedule. The period of the periodic schedule may be referred to as the "hint interval." In an example, each publication (network telemetry message) may contain data representing any change(s) in the covered telemetry metric over the most recent hint interval.

As an example of an abnormal scenario that may cause one or multiple network devices to produce abnormally large rates of network telemetry messages, a password (e.g., a pre-shared key expiration on a network switch or client device) may expire and result in a large number of network disassociation events (e.g., Institute of Electrical and Electronics Engineers (IEEE) 802.11 disassociation events). An on-change subscription for a network device may specific that the network device is to send a network telemetry message for each network disassociation event, and due to the password expiration, the network device may send a large number of network telemetry messages reporting the network disassociation events. For example, a network device may experience, on average, under 100 disassociation events per minute, but due to the password expiration, the network device may experience 100,000 or more disassociation events per minute. Moreover, multiple network devices may publish messages corresponding to disassociation events due to the same password expiration, thereby compounding the problem.

In accordance with example implementations, an NMS cluster manages network telemetry message flows (called "anomalous network telemetry message flows" herein) that have anomalous, or unexpected, behaviors, in a manner that does not overwhelm the network telemetry communication network, while still preserving network telemetry information associated with the message flows. More specifically, in accordance with some implementations, a central server of an NMS cluster detects, or identifies, anomalous network telemetry message flows, and the central server intelligently throttles the identified anomalous network telemetry message flows until the message flows once again exhibit normal, or expected, behaviors.

The central server, in accordance with example implementations, determines a bandwidth (called the "$B_r$ bandwidth" herein) that is available for the detected anomalous network telemetry message flows during a particular time period. The $B_r$ bandwidth, in accordance with example implementations, is the remaining bandwidth that is available for the network telemetry communication network, taking into account the bandwidths for non-anomalous network traffic (e.g., application bandwidth, non-anomalous network telemetry message flows and NMS management traffic). The central server throttles the anomalous network telemetry message flows to constrain the corresponding bandwidth consumed by the message flows to the $B_r$ bandwidth. The manner in which the central server performs the throttling depends on the network telemetry publication model. For an anomalous network telemetry message flow that is controlled by a subscription (or a "push-based model"), the central server replaces a base subscription (e.g., the default subscription) for the message flow with an adaptive subscription that constrains the message flow's bandwidth. For an anomalous network telemetry message flow that is controlled by polling (or a "pull-based model"), the central server increases the polling period to constrain the message flow's bandwidth.

In accordance with example implementations, the central server may, upon successful onboarding of a managed network device, send (via one or multiple messages) data (called "subscription information") to the network device representing telemetry metric subscriptions for the network device. The subscription information corresponds to base subscriptions (also called "non-adaptive" subscriptions or "default" subscriptions) for the network device. The network device, after being configured with the subscription information, may then begin generating and sending network telemetry message flows corresponding to the parameters of the base subscription.

In accordance with example implementations, the central server includes a message rate tracking engine to identify anomalous network telemetry message flows based on their respective message frequencies, or message rates. Moreover, in accordance with example implementations, the central server includes a subscription management engine to manage the network telemetry subscriptions of managed network devices in a way that throttles anomalous network telemetry message flows based on the $B_r$ bandwidth. More specifically, in accordance with example implementations, responsive to the message rate tracking engine determining that a particular network telemetry message flow is anomalous, the subscription management engine updates the corresponding base subscription (via one or multiple messages) to change the base subscription to an adaptive subscription. The adaptive subscription, relative to the base subscription, constrains the bandwidth of the anomalous network telemetry message flow. The constraint is referred to herein as "throttling" the anomalous network telemetry message flow to produce a corresponding "throttled" network telemetry message flow. In accordance with example implementations, when a previously anomalous network telemetry message flow has returned to exhibiting an expected behavior, the subscription management system reverts (via one or multiple messages) an adaptive subscription for the message flow back to the corresponding base subscription. Moreover, if the available bandwidth for an anomalous network telemetry message flow changes (e.g., the $B_r$ bandwidth changes or the number of anomalous network telemetry message flows changes), the subscription management engine may correspondingly adjust the throttling parameters (e.g., increase or decrease the allocated bandwidth) for the message flow.

In an example, a network device may provide a network telemetry message flow according to a particular base on-change subscription. In accordance with the base on-change subscription, the network device may generate network telemetry messages in response to an event or state changes of a particular telemetry metric. For this example, the message rate tracking engine may determine, based on a comparison of the message rate of the network telemetry message flow from a particular network device to one or multiple baselines, that the message flow exhibits an unexpected, or anomalous, behavior. Responsive to this determination, the subscription management engine may then replace the corresponding base on-change subscription with an adaptive on-change subscription so that the network device thereafter generates the network telemetry message flow according to the adaptive on-change subscription.

Continuing the example, the subscription management engine may determine the $B_r$ bandwidth available for all anomalous network telemetry message flows, and the subscription management engine may determine a bandwidth (called the "$B_{amt}$ bandwidth" herein) for all anomalous messages that have the same message subtype. In this context, a "message subtype" refers to a category, or group, associated with a particular network telemetry metric. In an example, the subscription management engine may determine that the particular message subtype that is associated with a particular anomalous network telemetry message flow has an associated weight (called the "$W_a$ weight" herein), such that the $W_a$ weights for all of the message subtypes add up to one. The subscription management engine may then determine that a bandwidth (called the "$B_{amt}$ bandwidth" herein) that is available for the message subtype is the $W_a$ weighted portion of the $B_r$ bandwidth, or $B_{amt} = B_r * W_a$. The subscription management engine may then allocate the anomalous network telemetry message flow for this example from the $B_{amt}$ bandwidth by constraining the bandwidth of the anomalous message flow to the allocated bandwidth.

In an example, for an anomalous network telemetry message that has a base on-change subscription, the subscription management engine may replace the base on-change subscription with an adaptive on-change subscription. The adaptive on-change subscription identifies an on-time window. The on-time window may be a portion of a regulation time period, which is measured by the network device and controls when the network device is allowed to send network telemetry messages during the regulation time period. For example, the network device may be prohibited from sending any network telemetry messages during the portion of the regulation time period, which is outside of the on-time window. The ratio of the on-time window duration to the regulation period corresponds to the degree of throttling that is imposed by the adaptive on-change subscription. In contrast, the base on-change allows the network device to send a message every time that a change in the covered network telemetry metric changes.

In an example, to constrain a message flow bandwidth that is associated with a periodic subscription, the subscription management engine may replace a base periodic subscription with an adaptive periodic subscription. With a periodic subscription, a network device may generate a network telemetry message when a change occurs (e.g., a state changes or an event occurs) during the most recent hint interval. In an example, a network device may generate messages according to a base periodic subscription to generate a corresponding network telemetry message flow, and this message flow may have an unexpectedly large message rate. Responsive to the detection of the anomalous message flow, the subscription management engine may replace the base periodic subscription with an adaptive periodic subscription that constrains the bandwidth of the message flow by increasing the hint interval.

In accordance with example implementations, the message rate tracking engine determines whether a given network telemetry message flow is anomalous based on a comparison of the flow's message rate to one or multiple message rate baseline(s). In an example, the message rate tracking engine may determine a local message rate baseline and determine whether a given message rate is an outlier, as compared to the local message rate baseline. In this context, a "local" message rate baseline refers to a baseline determined from observed message rates of a collection of managed network devices that share certain attributes in common.

In an example, a local message rate baseline may be associated with a particular message subtype and may be derived from the observed message rates of all of the managed network devices of the same NMS cluster (as compared to, for example, managed network devices from multiple NMS clusters). In another example, a local message rate baseline may be associated with a particular message subtype and may be derived from the observed message rates of all of the managed network devices of the same local branch network. In another example, a local message rate baseline may be associated with a particular message subtype and may be derived from the observed message rates of all of the managed network devices that are affiliated with the same NMS customer identification (ID).

The message rate tracking engine may determine multiple local baselines for the same message subtype. In an example, by applying different baselining algorithms, the message rate tracking engine may determine multiple local message rate baselines for a given message subtype from the observed message rates of the same set of managed network devices. In another example, the message rate tracking engine may determine multiple local message rate baselines for a given message subtype over different observation periods (e.g., baselines corresponding to respective observation periods of one hour, one day and three days).

In another example, the message rate tracking engine may determine a global message rate baseline and determine whether a given message rate is an outlier, as compared to the global message rate baseline. In this context, a "global" message rate baseline refers to a baseline for a particular message subtype, which is determined from the observed message rates of network devices that belong to multiple local groups.

In an example, a global message rate baseline for a particular message subtype may be derived from the observed message rates of managed network devices that are distributed across multiple local branch networks. In another example, a global message rate baseline for a particular message subtype may be derived from the observed message rates of managed network devices that are associated with multiple NMS customer IDs. In another example, a global message rate baseline for a particular message subtype may be derived from the observed message rates of all managed network devices that are similarly classified (e.g., network devices being of the same model or generation).

In accordance with example implementations, the message rate tracking engine may determine multiple global message rate baselines for a given message subtypes using, as examples, multiple baselining algorithms and/or different global groupings of network devices. Moreover, the message rate tracking engine may, in accordance with example implementations, determine multiple global message rate baselines for different respective observation periods.

In accordance with example implementations, the message rate tracking engine may apply a particular baseline policy for purposes of determining whether a particular network telemetry message flow is anomalous. The baseline policy is a rule or set of rules defining how different outlier determinations factor into deciding whether or not the corresponding message flow is considered to be anomalous. In an example of a baseline policy, the message rate tracking engine may compare a message rate of a network telemetry flow to multiple message rate baselines and determine, based on the comparisons, that the network telemetry message flow is anomalous if the message rate is an outlier according to all of the baselines. In another example of a baseline policy, the policy may specify that if the message rate is an outlier as compared to any baseline of multiple baselines, then the network telemetry message flow is considered to be anomalous. In another example, a baseline policy may specify particular combinatorial logic for combining multiple outlier determinations to determine whether the network telemetry message flow is considered to be anomalous. In another example, a policy may specify that if the message rate is an outlier as compared to a specific baseline, then the network telemetry message flow is considered to be anomalous, regardless of whether the message rate is considered to be an outlier as compared to other baselines.

The network management system, in accordance with example implementations, includes an imputation engine that extrapolates network telemetry content that may be missing from a throttled network telemetry message flow. In this manner, the imputation engine processes the content of a throttled network telemetry message flow to extrapolate content that would otherwise be reported if the message flow were not throttled. In an example, if the reporting periods for base and adaptive periodic subscriptions are 60 seconds and 130 seconds, respectively, then the imputation engine may, based on the content from a message flow that corresponds to the 130 second hint interval, provide a message flow (from processing and logging by the central server) that corresponds to the 60 second hint interval. The imputation engine may therefore present a customer-expected reporting for message flows that are throttled.

Referring to FIG. 1, as a more specific example, in accordance with some implementations, a computer network 100 includes one or multiple NMS clusters 112. Each NMS cluster 112 includes central NMS resources 170 and one or multiple network device deployments 118. The network device deployment 118 includes network devices 114 (also called "managed network devices 114" herein). In an example, the network device deployment 118 may correspond to a local branch network (e.g., a local area network (LAN)), such as a network that corresponds to a particular building, group of buildings, campus, edge computer system or datacenter. In another example, the network device deployment 118 may include multiple local branch networks. The network device deployment 118 may be associated with a particular geographical location, such as a campus site, a data center site, city, state, country or other geographical site. In accordance with some implementations, the central NMS resources 170 may be cloud-based resources that may be located in one or multiple datacenters. In an example, a particular network device deployment 118 may be associated with a particular NMS customer ID.

In accordance with example implementations, the network devices 114 and central NMS resources 170 may communicate over network fabric 164. In accordance with example implementations, the network fabric 164 may be associated with one or multiple types of communication networks, such as (as examples) Fibre Channel networks, Compute Express Link (CXL) fabric, dedicated management networks, local area networks (LANs), WANs, global networks (e.g., the Internet), wireless networks, or any combination thereof.

In accordance with example implementations, the central NMS resources 170 include a central server 176 that provides one or multiple NMS services 187. The NMS service(s) 187 may receive, as input, network telemetry metric values that are communicated via network telemetry message flows that are provided by the network devices 114. Due to various scenarios, at times, one or multiple network telemetry message flows may exhibit unexpected behaviors and as such, may be considered to be anomalous. For purposes of managing anomalous network telemetry message flows, the central server 176 includes a message rate tracking engine 178 and a subscription management engine 180.

In the context used herein, "managing" an anomalous network telemetry message flow refers to performing one or multiple actions to recognize and/or regulate the anomalous network telemetry message flow. In an example, managing an anomalous network telemetry message flow may include identifying one or multiple characteristics (e.g., a message rate or bandwidth) of the message flow that are unexpected (e.g., the message rate is an outlier as compared to a baseline). In another example, managing an anomalous network telemetry message flow includes throttling the message flow. In another example, managing an anomalous network telemetry message flow includes increasing a hint interval of a periodic subscription for the message flow. In another example, managing an anomalous network telemetry message flow includes, for a message flow associated with an on-change subscription, identifying an on-time window that restricts when the network device may publish messages. In another example, managing an anomalous network telemetry message flow includes restricting the bandwidth of the message flow. In another example, managing an anomalous network telemetry message flow includes increasing a period at which the network device that provides the flow is polled. In another example, managing an anomalous network telemetry message flow includes recognizing that a previously-identified anomalous network telemetry message flow is no longer anomalous and modifying throttling constraints (e.g., decrease a hint interval, no longer tie reporting to an on-time window, revert an adaptive subscription back to a base subscription or increase a polling rate) that were imposed on the message flow. In another example, managing an anomalous network telemetry message flow includes imputing data for the message flow that is otherwise missing due to the throttling of the message flow.

In accordance with example implementations, the message rate tracking engine 178 identifies anomalous network telemetry message flows based on the respective message rates of the message flows. The subscription management engine 180, in accordance with example implementations, throttles identified anomalous network telemetry message flows by replacing the base subscriptions of the flows with adaptive subscriptions. As also depicted in FIG. 1, in accordance with example implementations, the central server 176 may include an imputation engine 182 to provide extrapolated information for throttled network telemetry message flows.

The network NMS services 187 may include any of a number of different services for visualizing, analyzing, logging, collecting, querying and/or monitoring network telemetry metrics associated with the managed network devices 114. In an example, the central server 176 may serve data to a dashboard, such as a graphical user interface (GUI) 167, that allows an IT administrator to monitor network telemetry-affiliated events, traces and conditions and allows the IT administrator to submit, to the central server 176, queries for network device deployment information (e.g., network telemetry information, configuration information as well as other information related to the network device deployment 118). In an example, the GUI 167 may be provided by specific client software that is executed on an administrative node 165 or, as another example, may be provided by an Internet browser that executes on the administrative node 165. In an example, the GUI 167 may allow an IT administrator to manage various aspects of a cluster 112, such as configuring network devices 114, providing configuration data (e.g., configuration files) to be transferred to network devices 114, initiating firmware upgrades on network devices 114, setting up base subscriptions for network telemetry reporting, as well as various other management-related actions.

In an example, an NMS service 187 may identify potential or actual network device failure issues based on network telemetry metric values. In another example, an NMS service 187 may identify potential or actual network performance issues (e.g., issues with a network device or a subnet) based on network telemetry metric values. In another example, an NMS service 187 may oversee remedial actions to correct network issues. In another example, an NMS service 187 may identify performance issues with a customer device (e.g., a server) that is connected to or part of the network device deployment 118. In another example, an NMS service 187 may log network events. In another example, an NMS service 187 may serve responses to queries related to obtaining information about the network device deployment 118. In another example, an NMS service 187 may provide a recommended solution for an identified network issue. In an example, a recommendation may be a suggested reconfiguration, upgrade, or replacement for one or multiple network devices 114. In another example, a recommendation may be a suggested reconfiguration of a particular network subnet. In another example, a recommendation may be a suggested firmware upgrade for a particular network device 114 or group of network devices 114. In accordance with some implementations, the central server 176 includes one or multiple core network management system engines 184 to provide the network management system services 187.

In accordance with example implementations, the central NMS resources 170 include an activate server 174. In an example, when a network device 114 first connects to the network device deployment 118, a dynamic host protocol configuration (DHCP) server may provide, to the network device 114, an Internet Protocol (IP) address of the activate server 174 (e.g., provide the IP address as a DHCP option). The activate server 174, among its other functions, validates the network device 114, and the activate server 174 provides, to the network device 114, upon successful validation, network artifacts (e.g., an IP address and credentials) for connecting to the central server 176.

The central server 176, in accordance with example implementations, configures a newly-connected network device 114 to provide, or publish, network telemetry messages by providing subscription information 116 to the network device 114. The subscription information 116 contains entries that correspond to base subscriptions for different network telemetry metrics to regulate the publication, by the network device 114, of information about the metric values. In an example, a given entry of the subscription information 116 may, among other attributes, identify a particular message subtype (to correspondingly identify a particular network telemetry metric), identify whether the subscription is an on-change or periodic subscription, identify a hint interval for a periodic subscription and identify an IP address of the recipient of the network telemetry message flow.

In an example, for a periodic subscription, the subscription information 116 may contain data that represents the following entry:

| Cust1 | Serial 1 | Sub-ID1 | 60 | Default |
|-------|----------|---------|----|---------|

For this example, "Cust1" represents a particular Customer ID, "Serial 1" represents a particular network device serial number, and "Sub-ID1" represents a particular message subtype. Also, for this example, the entry corresponds to a periodic subscription having a 60 second hint interval, and "Default" denotes a base subscription.

In another example, for another periodic subscription, the subscription information 116 may contain data that represents the following entry:

| Cust2 | Serial 2 | Sub-ID1 | 10 | Default |
|-------|----------|---------|----|---------|

For this example, the periodic subscription has a 10 second hint interval.

In another example, for an on-change subscription, the subscription information 116 may contain data that represents the following entry:

| Cust3 | Serial 5 | Sub-ID3 | 0 | Default |
|-------|----------|---------|---|---------|

Here, the "0" in the hint interval field, denotes an on-change subscription.

The example subscription map entries above are base subscriptions, as represented by "default" in respective status fields of the entries. In accordance with example implementations, the status field may represent that the subscription is an adaptive subscription. For example, the example base on-change subscription map entry may be changed to be an adaptive subscription, as represented by data in the entry representing that the corresponding subscription is adaptive:

| Cust3 | Serial 5 | Sub-ID3 | 0 | Adaptive |
|-------|----------|---------|---|----------|

As described herein, for purposes of managing anomalous network telemetry message flows, the subscription management engine 180 may modify subscription information 116 entries in one or multiple network devices 114. The subscription management engine 180 may maintain data representing a subscription map 181 for purposes of tracking and managing the subscriptions of the network devices 114. In an example, the subscription management engine 180 may, responsive to the detection of a particular anomalous network telemetry message flow, replace a base subscription associated with the message flow with an adaptive subscription to throttle the message flow. In another example, the anomalous network telemetry message flow management may include the subscription management engine 180, responsive to a network telemetry message flow that was previously identified as being anomalous no longer exhibiting an anomalous behavior, replace an adaptive subscription corresponding to the message flow with the base subscription.

In the context that is used herein, a "network telemetry metric" refers to information or content from which an insight to a state of a network, network device or client device connected to network device(s) may be directly or indirectly determined. In an example, network telemetry data may include a periodically measured statistic of a network or network device metric, or measurement. In an example, a statistic may be a traffic flow volume (e.g., a traffic flow volume for a particular VLAN) for a particular sampling period. In other examples, a statistic may be a periodically measured egress bandwidth, an ingress bandwidth, a latency, a round trip time, or a usage of a resource or an activity of a host. In other examples, network telemetry data may represent a value of a counter of a network device, a configuration setting of a network device, an event log of a network device, a state snapshot of a network device, a configuration snapshot of a network device, or other information about a network device. Network telemetry data may represent events. In an example, a network device may send network telemetry messages, which are triggered by certain change events (e.g., a network telemetry message triggered by the sending of a disassociation message by the network device). In general, network telemetry data may represent information about the control, management and/or data planes of a network.

In the context that is used herein, a "network device" refers to an actual, or physical electronic component, which enables data communication between other components. In an example, a network device may be a switch that operates at level two (L2) of the Open Systems Interconnection (OSI) model to connect components of a computer network together. In another example, a network device may be a level three (L3) switch that connects both components of a computer network together and connects computer networks together. In other examples, a network device may be a gateway, a multicast router, a bridge, a component of a Gen-Z or a Compute Express Link (CXL) network, a processor device, a network interface controller (NIC) or a fabric switch that includes one or multiple of the foregoing devices. A network device may be a wired or wireless device.

In accordance with some implementations, a server, such as the activate server 174 or the central server 176, may correspond to machine-readable instructions (or "software") that are executed on one or multiple nodes 188 of the central NMS resources 170. In the context that is used herein, a "node" refers to a processor-based entity that has an associated set of hardware and software resources. As depicted in FIG. 1, a node 188 may have one or multiple associated hardware processors 190 (e.g., one or multiple central processing unit (CPU) cores and/or one of multiple graphical processing unit (GPU) cores) and an associated memory 192. The memory 192 is non-transitory storage media that may be formed from semiconductor storage devices, memristor-based storage devices, magnetic storage devices, phase change memory devices, a combination of devices of one or more of these storage technologies, and so forth. The memory 192 may represent a collection of memories of both volatile memory devices and non-volatile memory devices. In accordance with some implementations, the memory 192 may store machine-readable instructions that, when executed by one or multiple hardware processors 190 cause the hardware processor(s) 190 to form instances of components of the activate server 174 and the central server 176. In an example, the memory 192 may store machine-readable instructions that, when executed by one or multiple hardware processors 190 cause the hardware processor(s) 190 to form instances of the message rate tracking engine 178, the subscription management engine 180, the imputation engine 182 and one or multiple core network management system engines 184.

In an example, a node 188 may be an actual, or physical, entity, such as a computer platform or a part (e.g., a part corresponding to a group of CPU cores or CPU cores) of a computer platform. In this context, a "computer platform" is a processor-based electronic device, which has an associated operating system. In examples, a computer platform may be a rack server or blade server. In another example, a node 188 may be a virtual entity that is an abstraction of physical hardware and software resources, such as a virtual machine. Depending on the particular implementation, multiple nodes 188 may be located on one or multiple virtual or physical machines. Moreover, in accordance with example implementations, nodes 188 may be distributed across virtual or physical machines that are located at different geographical locations (e.g., located in different data centers).

As used here, an "engine" can refer to one or more circuits. For example, the circuits may be hardware processing circuits, which can include any or some combination of a microprocessor, a core of a multi-core microprocessor, a microcontroller, a programmable integrated circuit (e.g., a programmable logic device (PLD), such as a complex PLD (CPLD)), a programmable gate array (e.g., field programmable gate array (FPGA)), an application specific integrated circuit (ASIC), or another hardware processing circuit. An "engine" can refer to a combination of one or more hardware processing circuits and machine-readable instructions (software and/or firmware) executable on the one or more hardware processing circuits. In accordance with some implementations, one or multiple engines of the central NMS resources 170, such as the message rate tracking engine 178, subscription management engine 180, imputation engine 182 and/or core NMS engine(s) 184 may be formed by one or multiple hardware processors 190 executing machine-readable instructions.

In accordance with some implementations, the central NMS resources 170 may include multiple activate servers 174 and multiple central servers 176 for the same NMS cluster 112. In an example, for high availability (HA), a given service container for a particular cluster 112 may contain an HA group of activate servers 174 and an HA group of central servers 176, so that should a given active server 174,176 fail, another server 174,176 may take over for the failed server 174,176 of the HA group.

Figure 2:
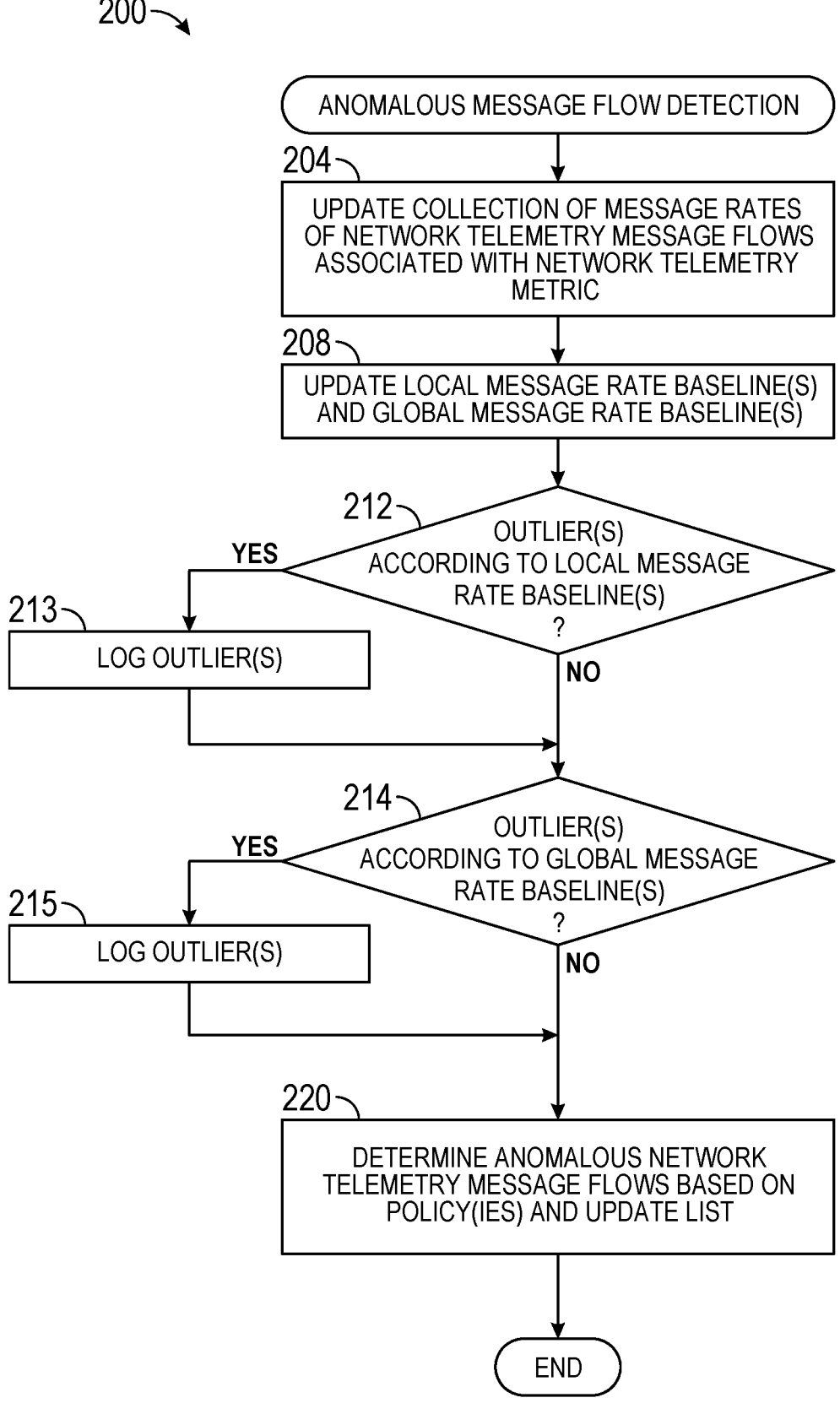
FIG. 2 is a flow diagram depicting a process to detect anomalous network telemetry message flows according to an example implementation.

FIG. 2. depicts a process 200 to detect anomalous network telemetry message flows in accordance with example implementations. In an example, the process 200 may be performed by the message rate tracking engine 178 of FIG. 1. The process 200 depicts anomalous network telemetry message flow detection for a particular network telemetry metric (also referred to as corresponding to a particular "message subtype" herein).

Referring to FIG. 2, in accordance with example implementations, the process 200 includes updating (block 204) a collection of observed message rates of incoming network telemetry message flows for a particular network telemetry metric. The network telemetry message flows may be received at a particular virtual or physical network interface of a central network and management system. In this context, a "collection" of observed message rates refers to a set, or group, of message rates within a particular time period. In an example, the process 200 may collect message rates over a sliding, or moving, window of time. In another example, the process 200 may collect message rates over a particular fixed regulation period.

The updated collection of observed message rates may be used, as depicted in block 208, to update one or multiple local message rate baselines and one or multiple global message rate baselines. In example, block 208 may include determining a local message rate baseline based on the message rates of network devices in the same local branch network. In another example, block 208 may include determining the local message rate baseline based on the message rates of network devices that are associated with the same customer identifier. In another example, block 208 may include determining a global message rate baseline based on the message rates of network devices across multiple local branches. In another example, block 208 may include determining a global message rate baseline based on the message rates of network devices across multiple customers. In another example, block 208 may include determining multiple local message rate baselines and/or multiple global message rate baselines over different time periods. In another example, block 208 may include determining multiple local message rate baselines and/or multiple global message rate baselines using different baselining algorithms. In another example, block 208 may include determining multiple local message rate baselines and/or different global message rate baselines for different groups of network devices.

The determination of a global or local baseline may include applying an outlier detection algorithm to a particular set of message rates (e.g., message rates corresponding to the network devices in the same local branch network or message rates corresponding to network devices that are associated with the same customer identifier). Any of a number outlier detection algorithms may be applied to a collection of message rates to determine a message rate baseline, depending on the particular implementation. In examples, an outlier detection algorithm may use a supervised machine learning-based model or use an unsupervised machine learning-based model.

In an example, block 208 may apply a K-Nearest Neighbors (KNN) algorithm to a collection of message rates. In an example, a distance may be determined for each message rate of the collection, such as a distance determined based on the differences between the message rate and each of the K-closest message rates of the collection. The resulting set of distances may include a cluster of KNN distances that correspond to a baseline. The baseline may correspond to a particular range of distances. In an example, a particular threshold distance (e.g., a distance determined based on a statistical measure or based on another criterion) may define the boundaries of the baseline, such that a message rate that corresponds to a distance that exceeds the threshold distance may be considered to be an outlier.

Block 208 of the process 200 may apply an outlier detection algorithm other than a KNN algorithm, to derive a baseline and identify outliers, in accordance with further implementations. In another example, an interquartile range baselining algorithm may be used to derive a baseline and detect message rate outliers relative to the baseline. In another example, an isolation forest algorithm may be used to derive a baseline and detect message rate outliers relative to the baseline. In another example, median absolute deviation algorithm may be used to derive a baseline and detect message rate outliers relative to the local baseline.

Regardless of the particular baselining algorithm(s) that are used, the process 200 includes determining (decision block 212) whether there are one or multiple message rate outliers relative to the respective local baseline(s). If one or multiple message rate outliers are detected, then, as depicted in block 213, the process 200 may include logging the detected message rate outlier(s). The logging 213 may include, for example, logging information that identifies the message flow(s) that correspond to the message rate outlier(s). Pursuant to decision block 214, the process 200 includes determining where there are any message rate outliers relative to the respective global baseline(s). If one or multiple message rate outliers are detected, then, as depicted in block 215, the process 200 may include logging the detected message rate outlier(s). The logging 213 may include, for example, logging information that identifies the message flow(s) that correspond to the message rate outlier(s).

The process 200 next includes determining (block 220), based on the application of one or multiple baselining policies to the detected outlier(s), whether any of the network telemetry message flows are anomalous. In an example, a particular baselining policy may classify a particular message flow as being anomalous based on whether the corresponding message rate is considered to be an outlier according to a particular message rate baseline. In another example, a particular policy may classify a particular message flow as being anomalous if the corresponding message rate is considered to be an outlier according to a certain set of baselines. In another example, a particular policy may classify a particular message flow as being anomalous if the corresponding message rate is considered to be an outlier according to any of the applied local and/or global baselining algorithms.

In accordance with some implementations, the process 200 may include evaluating whether an already throttled network telemetry message flow should still be considered anomalous. In an example, the process may evaluate an extrapolated message rate for a throttled message flow for purposes of determining whether the extrapolated message rate is considered to be an outlier. For this purpose, the process 200 may, for example, receive the extrapolated rate from an imputation engine (e.g., the imputation engine 182 of FIG. 1) that estimates an extrapolated message flow for a throttled message flow based on the observed throttled message flow.

Block 220 may include, in accordance with example implementations, updating a list of anomalous network telemetry message flows. This update may include such actions as add, retaining and/or removing network telemetry message flows from the list.

Figure 3:
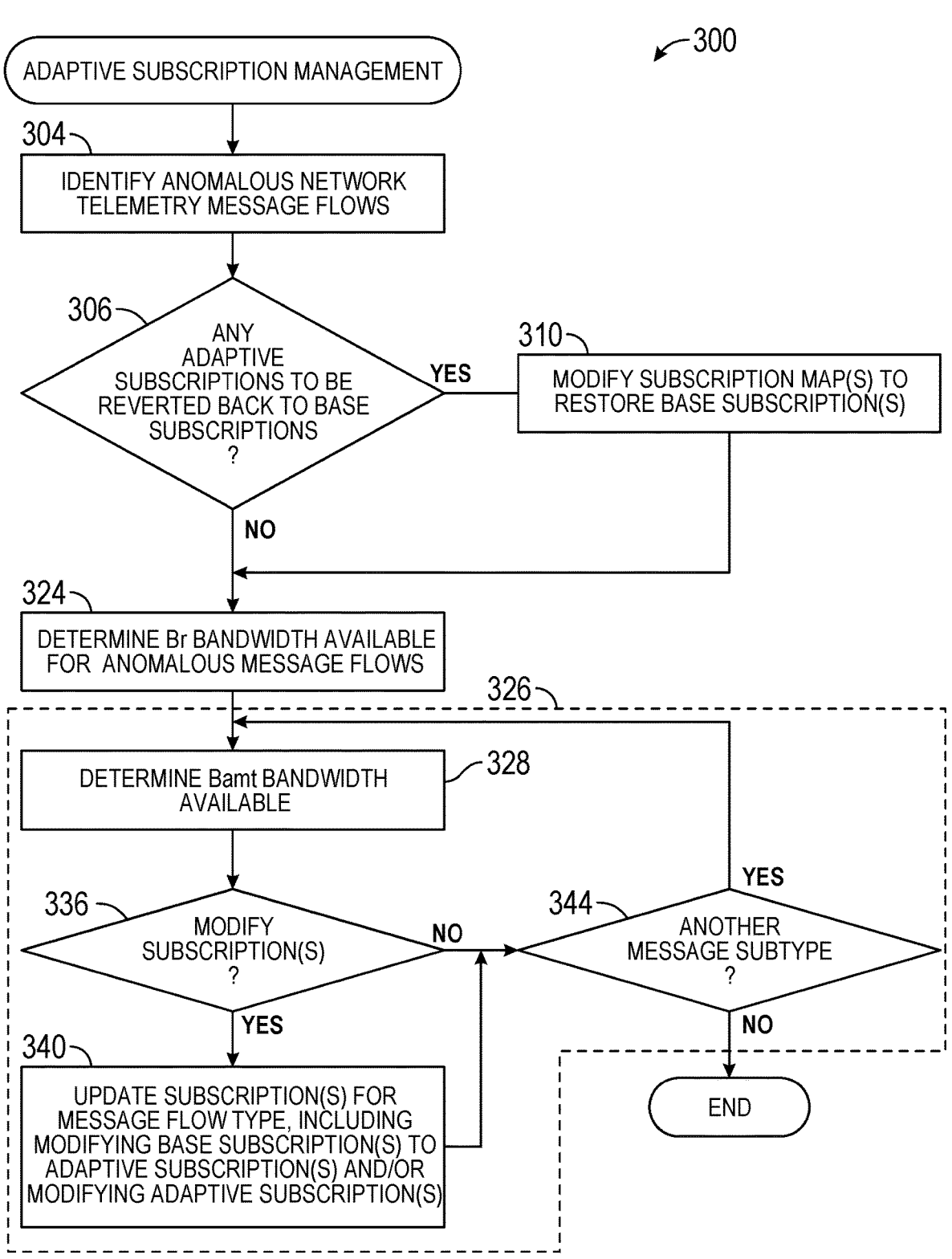
FIG. 3 is a flow diagram depicting a process to adaptively manage network telemetry subscriptions to manage anomalous network telemetry message flows according to an example implementation.

FIG. 3 depicts an adaptive subscription management process 300 to manage anomalous network telemetry message flows in accordance with example implementations. In an example, the process 300 may be performed by the subscription management engine 180 of FIG. 1.

Referring to FIG. 3, the process 300 includes identifying (block 304) any anomalous network telemetry message flows. In an example, block 304 may include accessing a list of anomalous network telemetry message flows, which is provided by a message rate tracker, such as the message rate tracking engine 178 of FIG. 1. The process 300 includes determining (decision block 306) whether any adaptive subscriptions are to be reverted back to corresponding base subscriptions. In an example, a subscription management engine may maintain a list of adaptive subscriptions in a subscription map for purposes of allowing identification of any network telemetry message flow that was previously determined to be anomalous and have a corresponding adaptive subscription, but the network telemetry message flow may no longer be considered anomalous. If there are any adaptive subscriptions that are to be reverted back to corresponding base subscriptions, then, pursuant to block 310 of the process 300, the modifications are made. In an example, changing a subscription from an adaptive subscription to a base subscription may include a subscription management engine sending a message to a network device to cause the network device to update a corresponding subscription entry that is stored in the network device.

Pursuant to block 324, the process 300 includes determining the $B_r$ bandwidth that is available for anomalous network telemetry message flows during a t minute regulation period. In accordance with example implementations, the process 300 determines the $B_r$ bandwidth in block 324 as follows. First, the process 300 determines a total available bandwidth (called the "$B_a$ bandwidth" herein) for all message subtypes for the t minute regulation period. In an example, the $B_a$ bandwidth may be, for the t minute regulation period, the maximum bandwidth (called the "$B_m$ bandwidth" herein) that is consumed bandwidth by application traffic less the bandwidth (called the "$B_c$ bandwidth" herein) of NMS cluster management data and less the bandwidth (called the "$B_g$ bandwidth" herein) of the remaining miscellaneous general data. Accordingly, the $B_a$ bandwidth may be described as $B_a = B_m - B_c - B_g$. The process 300 may determine the duration t of the regulation period based on one or multiple characteristics, such as a frequency of the message flows and the message subtype. In general, a long duration for t provides a better opportunity for extrapolation in the case of missed events.

In accordance with example implementations, the process 300 the $B_r$ total bandwidth is the $B_a$ bandwidth less the bandwidth (called the "$B_{an}$ bandwidth" herein) consumed by normal, non-anomalous network telemetry metric flows, or $B_r = B_a - B_{an}$.

After the determination of the $B_r$ bandwidth, the process 300 next includes performing a subprocess 326 to manage the subscriptions of the anomalous network telemetry message flows so that the anomalous network telemetry message flows are constrained to the $B_r$ bandwidth. The subprocess 326 includes determining (block 328) the $B_{amt}$ bandwidth available for anomalous message flows for the next message subtype. In accordance with example implementations, the process 300 determines $B_{amt}$ bandwidth available for a particular subtype by weighting the $B_r$ bandwidth by a $W_a$ weight that is assigned to the message subtype, or $B_{amt} = B_r * W_a$. In accordance with example implementations, the process 300 assigns each message subtype a $W_a$ weight. Due to the $W_a$ weights, certain message subtypes may be assigned higher values and importance than others. A particular $W_a$ weight may be based on one or multiple criteria, such as the relative importance of the customer, the relative importance of the message subtype and characteristics of the network devices. The summation of all of the $W_a$ weights equals one.

Pursuant to decision block 336, the process 300 includes determining whether there are any subscriptions to modify. In an example, if a particular anomalous network telemetry message flow currently has a base subscription, then, pursuant to decision block 336, a determination may be made that the base subscription is to be replaced with an adaptive subscription. In another example, if a particular anomalous network telemetry message flow currently has an adaptive subscription and the $B_{amt}$ bandwidth has not changed since the last regulation period, then pursuant to decision block 336, a determination may be made to not further modify the adaptive subscription. In another example, if a particular anomalous network telemetry message flow currently has an adaptive subscription and the $B_{amt}$ bandwidth has changed since the last regulation period, then pursuant to decision block 336, a determination may be made to modify the adaptive subscription based on the new $B_{amt}$ bandwidth.

If a decision is made in decision block 336 to modify any subscriptions, then the subscription(s) are modified, pursuant to block 340. In accordance with example implementations, block 340 may involve, for a given subscription to be modified, determining a bandwidth (called the "unthrottled bandwidth" herein) for the anomalous message flows without throttling; determining a ratio of the $B_{amt}$ bandwidth to the unthrottled bandwidth, and then adapting the subscription based on the ratio to constrain the anomalous message flows to the $B_{amt}$ bandwidth. When no more subscriptions are to be modified for the particular message type, then the process 300 includes determining (decision block 344) whether there are any remaining message subtypes to process, and if so, control returns to block 328.

In a more specific example of the updating of subscriptions to throttle anomalous network telemetry message flows, 100 network devices may have on-change subscriptions to report IEEE 802.11 disassociation messages in response to network disassociation events. For this example, there are, on average, 80 IEEE 802.11 disassociation messages per minute for a non-anomalous message flow. In a five minute period, there may be a corresponding average number of 400 IEEE 802.11 disassociation messages. For this example, there are 95 network devices that are sending the expected average number of IEEE 802.11 disassociation messages in corresponding normal, or non-anomalous, messages flows. Due to an abnormal event (e.g., an expired password), five network devices provide IEEE 802.11 disassociation message flows that have respective message rates of 130,000 messages per five minute period and are considered for this example to be anomalous message flows. Therefore, for this example, there are 61,757,600 total IEEE 802.11 disassociation messages (anomalous and non-anomalous) in a five minute period: 130,000*5 (number of messages of anomalous message flows)+400*95 (number of messages of non-anomalous message flows)=61,757,600 events. The message size of a message reporting an IEEE 802.11 disassociation, for this example, is 128 bytes. Therefore, the total bandwidth for the IEEE 802.11 disassociation messages for all 100 network devices during the five minute period is 128*61757600=7,904,972,800 bytes.

Continuing the example, the $B_{amt}$ bandwidth available for anomalous message flows may be derived as follows. The $B_m$ maximum application traffic bandwidth at the interface during a five minute period is 4 gigabytes (GB), or 4,294, 967,296 bytes. The $B_c$ NMS cluster management bandwidth for the five minute period is 5,242,880 bytes. The $B_g$ miscellaneous data bandwidth for the given minute period is 0,242,880 bytes. The $B_a$ total available bandwidth for this example is therefore $B_m - B_c - B_g = 4,239,481,536$ bytes. Therefore, the $B_{amt}$ bandwidth available for anomalous message flows is total bandwidth remaining for message flow is 38,864,000 bytes, or approximately 38 megabytes (MB). For this example, the $W_a$ relative weight of the disassociation event message subtype is ⅕, or 0.20.

The unthrottled bandwidth for the anomalous message flows for this example for a five minute period is 130,000 events*5 devices 128 bytes per 802.11 disassociation message is 83,200,000 bytes, or approximately 83 MB. The bandwidth throttling ratio for this example is 0.45, or 38/83. The base subscription may therefore be replaced with an adaptive subscription that constrains the message flow to a ratio of 0.45 of its non-throttled bandwidth. For an adaptive on-change subscription, the subscription identifies an on-time window such that the ratio of the on time to a total regulation period is 0.45. For an adaptive periodic subscription, the subscription specifies a new hint interval, such that the ratio of the new hint interval to the old hint interval is 1/0.45, or 2.22.

Figure 4:
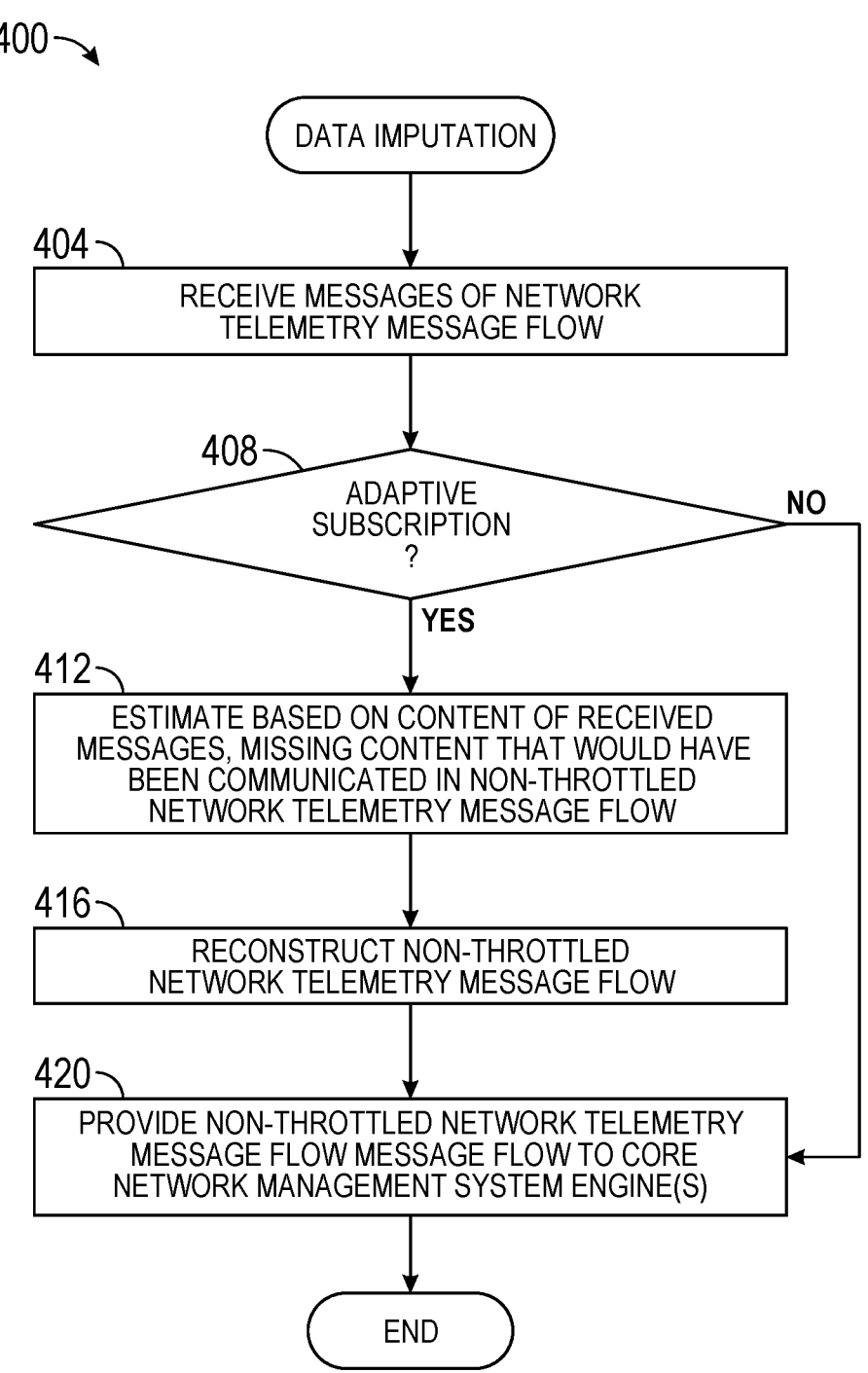
FIG. 4 is a flow diagram depicting a process to impute information content missing from a network telemetry message flow associated with an adaptive subscription according to an example implementation.

FIG. 4 depicts a process 400 for imputing, or extrapolating, content for a throttled network telemetry message flow. In this manner, the extrapolated content corresponds to content that is estimated to have been present in the non-throttled message flow but is absent from the throttled message flow. In an example, the process 400 may be performed by the imputation engine 182 of FIG. 1.

Referring to FIG. 4, in accordance with example implementations, the process 400 includes receiving (block 404) messages of a network telemetry message flow. Pursuant to decision block 408, a determination is made whether the network telemetry message flow corresponds to an adaptive subscription. In an example, decision block 408 may include a data imputation engine consulting a subscription map that is maintained by a network management system. As depicted in FIG. 4, if the network telemetry message flow does not correspond to an adaptive subscription, then the message flow is provided unaltered to one or multiple core network management system engines, pursuant to block 420.

If, pursuant to decision block 408, a determination is made that the network telemetry message flow corresponds to an adaptive subscription, then, pursuant to block 412, the process 400 includes estimating missing content that would have been communicated in the corresponding non-throttled network telemetry message flow and reconstructing (block 416) the non-throttled network telemetry message flow.

In an example, the network telemetry message flow may correspond to an adaptive periodic subscription having a hint interval that is of a longer duration than the hint interval of the corresponding base subscription. In an example, the original hint interval of the base subscription may be 60 seconds, and the hint interval of the adaptive periodic subscription may be 130 seconds. Based on the content present in the received messages of the throttled network telemetry message flow, block 412 may include determining the network telemetry reports at the 60 second hint interval. Moreover, in an example, block 412 may include determining content for the next, upcoming corresponding 60 second hint interval. With the extrapolated data, block 416 includes reconstructing the message flow, pursuant to the 60 second hint interval to provide a presentation of the message flow in the absence of throttling. In another example, network telemetry message flow may correspond to an on-change adaptive subscription. For this example, block 412 may include reconstructing a sequence of messages corresponding to the non-throttled, base subscription based on the content in the throttled message flow. Moreover, in accordance with example implementations, the process 400 may include estimating a message rate for the reconstructed message flow, so that this message rate may be evaluated for purposes of determining whether the message flow is still considered to be anomalous.

Other implementations are contemplated, which are within the scope of the appended claims. For example, the subscription management engine 180 of FIG. 1 is an example of a network telemetry management engine that regulates the bandwidths of anomalous network telemetry message flows. In accordance with further example implementations, a network telemetry management engine may regulate the bandwidth of an anomalous network telemetry message flow that is produced by polling. More specifically, in accordance with example implementations, a central server of a network telemetry management system cluster may use a pull-based telemetry reporting model. In this manner, the central serve may include a polling engine that polls network devices for network telemetry metric information at periodic polling periods. In an example, the periodic polling periods may vary according to the network metric information being requested. In accordance with example implementations, a network telemetry management engine of the central server may adjust the bandwidth of a particular anomalous network telemetry message flow to decrease the message flow's bandwidth. In an example, the network telemetry management engine may determine a $B_{amt}$ bandwidth for an anomalous network telemetry message flow that has a current bandwidth (called "$B_{anom}$") and is currently being polled at a first polling period (called "$T_1$"). The network telemetry management engine may replace the $T_1$ polling period with a second, longer polling period ($T_2$) that has a duration that decreases the $B_{anom}$ bandwidth to the $B_{amt}$ bandwidth. In an example, the network telemetry management engine may determine the $T_2$ polling period as follows: $T_2 = T_1 * (B_{anom}/B_{amt})$.

Referring to FIG. 5, in accordance with example implementations, a process 500 includes monitoring (block 504) by a message rate tracking engine, a plurality of message flows sent by respective network devices of a plurality of network devices. The plurality of message flows is associated with reporting a network telemetry metric to a network management service. In an example, a message flow may be generated and sent by a network device according to an on-change subscription. In another example, a message flow may be generated and sent by a network device according to a periodic subscription. In an example, the plurality of network devices may correspond to a network device deployment of an NMS cluster. In an example, the network devices may be part of the same branch network. In another example, the network devices may be distributed across multiple branch networks. In an example, the message rate tracker may be a component of a set of central NMS components. In an example, the set of central NMS components may be cloud-based. In an example, the message rate tracking engine may be part of a central server. In an example, the message rate tracking engine may correspond to machine-readable instructions that are executed by one or multiple processors.

The process 500 includes determining (block 508), by the message rate tracker, that a given message flow of the plurality of message flows exhibits an unexpected behavior. In an example, determining that the given message flow exhibits an unexpected message flow may include determining one or multiple message rate baselines and comparing a message rate of the given message flow to the baseline(s). In an example, determining that the given message flow exhibits an unexpected message flow may include determining whether a message rate of the given message flow is an outlier, as compared to a message rate baseline. In an example, determining whether a message is an outlier may include applying a KNN baselining algorithm. In an example, determining whether a message rate is an outlier may include applying an interquartile range baselining algorithm. In an example, determining whether a message rate is an outlier may include applying an isolation forest baselining algorithm. In an example, determining whether a message rate is an outlier may include applying a median absolute deviation baselining algorithm. In an example, determining whether the given message flow exhibits an unexpected behavior includes applying a baselining policy based to the outlier detection(s).

The process 500 includes, responsive to determining that the given message flow exhibits the unexpected behavior, determining (block 512), by a subscription manager, an aggregate available bandwidth for message flows of the plurality of message flows, which respectively exhibit expected behaviors. In accordance with example implementations, determining the aggregate available bandwidth may take into account a maximum application bandwidth. In accordance with example implementations, determining the aggregate available bandwidth may take into account a cluster management bandwidth.

The process 500 includes, responsive to determining that the given message flow exhibits the unexpected behavior, determining (block 508), by the subscription manager, an adjusted bandwidth for the given message flow based on the aggregate available bandwidth. In an example, determining the adjusted bandwidth includes determining a bandwidth for the given message flow based on the aggregate available bandwidth and a weight. In an example, the weight corresponds to a message subtype associated with the given message flow.

The process 500 includes, responsive to determining that the given message flow exhibits the unexpected behavior, modifying (block 512), by the subscription manager, a subscription of the given network device to the network management service based on the adjusted bandwidth. In an example, the subscription is an on-change subscription, and modifying the subscription includes specifying an on-time window in an adaptive subscription for the given message flow to constrain the bandwidth consumed by the given message flow to the adjusted bandwidth. In an example, the subscription is a periodic subscription, and modifying the subscription includes specifying a hint interval in an adaptive subscription, which is longer than a hint interval in the corresponding base subscription to constrain the bandwidth consumed by the given message flow to the adjusted bandwidth.

Referring to FIG. 6, in accordance with example implementations, a non-transitory storage medium 600 stores machine-readable instructions 610 that, when executed by a machine, cause the machine to receive an indication that a first message flow of a plurality of message flows is anomalous. The plurality of message flows is provided by a plurality of network devices over a network to report to network telemetry metrics according to corresponding subscriptions. In an example, the instructions 610 may be executed on one or multiple nodes of a set of central NMS resources. In an example, the set of central NMS resources may be cloud-based. In an example, the central resources may be associated with a central server of an NMS cluster. In an example, a message flow may be generated and sent by a network device according to an on-change subscription. In another example, a message flow may be generated and sent by a network device according to a periodic subscription. In an example, the plurality of network devices may correspond to a network device deployment of an NMS cluster. In an example, the network devices may be part of the same branch network. In another example, the network devices may be distributed across multiple branch networks.

In an example, determining that a message flow is anomalous may include determining one or multiple message rate baselines and comparing a message rate of the message flow to the baseline(s). In an example, determining that a message flow is anomalous may include determining that a message rate of the message flow is an outlier, as compared to a message rate baseline. In an example, determining whether a message rate is an outlier may include applying a KNN baselining algorithm. In an example, determining whether a message rate is an outlier may include applying an interquartile range baselining algorithm. In an example, determining whether a message rate is an outlier may include applying an isolation forest baselining algorithm. In an example, determining whether a message rate is an outlier may include applying a median absolute deviation baselining algorithm. In an example, determining that a message flow is anomalous includes applying a baselining policy based to one or multiple outlier detection(s).

The instructions 610, when executed by the machine, cause the machine to, responsive to receiving the indication, determine a first bandwidth that is available for anomalous message network telemetry communications in the network. In accordance with example implementations, determining the first bandwidth may take into account a maximum application bandwidth. In accordance with example implementations, determining the first bandwidth may take into account a cluster management bandwidth.

The instructions 610 further cause the machine to, responsive to receiving the indication, determine a second bandwidth that is available for a first network device of the plurality of network devices based on the first bandwidth. In an example, determining the second bandwidth includes determining a bandwidth for a message flow based on the aggregate available bandwidth and a weight. In an example, the weight corresponds to a message subtype associated with the message flow.

The instructions 610, when executed by the machine, further cause the machine to, responsive to receiving the indication, replace a first subscription that is associated with the first network device with a second adaptive subscription that corresponds to the second bandwidth. In an example, the first subscription is an on-change subscription, and the second adaptive subscription specifies an on-time window to constrain the message flow to the second bandwidth. In an example, the subscription is a periodic subscription, and the second adaptive subscription specifies a hint interval in an adaptive subscription, which is longer than a hint interval in the first subscription constrain the bandwidth consumed by the message flow to the second bandwidth.

Referring to FIG. 7, in accordance with example implementations, a computer system 700 includes a network telemetry message for a tracking engine 704 and a network telemetry management engine 708. The network telemetry message rate tracking engine 704 monitors a plurality of message flows sent by respective network devices of a plurality of network devices. The plurality of message flows is associated with reporting a network telemetry metric to a network management system. The network telemetry message rate tracking engine 704 determines that a rate of a given message flow of the plurality of message flows is an outlier. In an example, a message flow may be generated and sent by a network device according to an on-change subscription. In another example, a message flow may be generated and sent by a network device according to a periodic subscription. In an example, the plurality of network devices may correspond to a network device deployment of an NMS cluster. In an example, the network devices may be part of the same branch network. In another example, the network devices may be distributed across multiple branch networks. In an example, the network telemetry message rate tracking engine 704 may be a component of a set of central NMS components. In an example, the set of central NMS components may be cloud-based. In an example, the network telemetry message rate tracking engine 704 may be part of a central server. In an example, the message rate tracking engine may correspond to machine-readable instructions that are executed by one or multiple processors.

In an example, the network telemetry message rate tracking engine 704 determines that the rate is an outlier by applying a KNN baselining algorithm. In an example, the network telemetry message rate tracking engine 704 determines that the rate is an outlier by applying an interquartile range baselining algorithm. In an example, the network telemetry message rate tracking engine 704 determines that the rate is an outlier by applying an isolation forest baselining algorithm. In an example, the network telemetry message rate tracking engine 704 determines that the rate is an outlier by applying a median absolute deviation baselining algorithm. In an example, the network telemetry message rate tracking engine 704 determines that the rate is an outlier by applying a baselining policy based to the outlier detection(s).

The network telemetry management engine 708, responsive to the network telemetry message tracking engine determining that the rate is an outlier, determines an aggregate available bandwidth for message flows of the plurality of message flows, which have respective expected rates. The network telemetry management engine 708, responsive to the network telemetry message tracking engine 704 determining that the rate is an outlier, determines an adjusted bandwidth for the given message flow based on the aggregate available bandwidth. The network telemetry management engine 708, responsive to the network telemetry message tracking engine 704 determining that the rate is an outlier, modifies a bandwidth that is associated with the given message flow based on the adjusted bandwidth.

In an example, a given network device may provide the given message responsive to a pull model. In an example, according to the pull model, a network telemetry management system cluster polls the given network device at a first periodic rate to cause the given network device to provide the given message flow. The first periodic polling rate has an associated first polling period. In an example, the network telemetry management engine may modify the bandwidth associated with the given message flow by reducing the first periodic polling rate to a second periodic polling rate. The second periodic polling rate has an associated second period that is greater than the first period.

In an example, the given network device may provide the given message flow responsive to a push model, or subscription. In an example, the subscription is an on-change subscription, and the modified subscription specifies an on-time window to constrain the message flow to the second bandwidth. In another example, the subscription is a periodic subscription, and the modified subscription specifies a hint interval in an adaptive subscription, which is longer than a hint interval in the first subscription constrain the bandwidth consumed by the message flow to the second bandwidth.

In accordance with example implementations, determining that the given message flow exhibits the unexpected behavior includes comparing a message rate of the given message flow with a message rate threshold. A particular advantage is that anomalous network telemetry flows may be identified and throttled in an intelligent manner that takes into account bandwidth constraints of the network without unduly restricting the communication of network telemetry metric information from the managed network.

In accordance with example implementations, a message rate threshold is determined. Determining the message rate threshold includes applying a baselining algorithm to a plurality of message rates associated with the network telemetry metric and associated with a plurality of network devices of a local network that contains the given network device. A particular advantage is that anomalous network telemetry flows may be identified and throttled in an intelligent manner that takes into account bandwidth constraints of the network without unduly restricting the communication of network telemetry metric information from the managed network.

In accordance with example implementations, a message rate threshold is determined. Determining the message rate threshold includes applying a baselining algorithm to a plurality of message rates associated with the network telemetry metric and associated with a plurality of network devices located in at least one other local network than a local network that contains the given network device. A particular advantage is that anomalous network telemetry flows may be identified and throttled in an intelligent manner that takes into account bandwidth constraints of the network without unduly restricting the communication of network telemetry metric information from the managed network.

In accordance with example implementations, a second network device of the plurality of network devices sends messages of a network telemetry message flow pursuant to a periodic subscription interval. The process incudes, responsive to determining that the given message flow exhibits the unexpected behavior, modifying a subscription of a second network device of the plurality of network devices to increase a periodic subscription interval in which the second network device sends messages of the respective message flow. A particular advantage is that anomalous network telemetry flows may be identified and throttled in an intelligent manner that takes into account bandwidth constraints of the network without unduly restricting the communication of network telemetry metric information from the managed network.

In accordance with example implementations, the process further includes, responsive to determining that the given message flow exhibits the unexpected behavior, modifying, by the subscription manager, a second subscription of a periodic message flow associated with reporting a second network telemetry metric to the network management system. Modifying the second subscription includes increasing a period of the periodic subscription from a first reporting time interval to a second reporting time interval to decrease a bandwidth of the periodic message flow. A particular advantage is that anomalous network telemetry flows may be identified and throttled in an intelligent manner that takes into account bandwidth constraints of the network without unduly restricting the communication of network telemetry metric information from the managed network.

In accordance with example implementations, the process further includes receiving, by the network management system, the periodic message flow corresponding to the second reporting time interval to provide a received periodic message flow. The process further includes imputing, by the network management system, content that is missing in the received periodic message flow corresponding to the difference between the first reporting time interval and the second reporting time interval. A particular advantage is that anomalous network telemetry flows may be identified and throttled in an intelligent manner that takes into account bandwidth constraints of the network without unduly restricting the communication of network telemetry metric information from the managed network.

In accordance with example implementations, the received periodic message flow includes first samples of a network telemetry statistic. The imputing includes estimating additional second samples of the network telemetry statistic corresponding to the difference between the first reporting time interval and the second reporting time interval. A particular advantage is that anomalous network telemetry flows may be identified and throttled in an intelligent manner that takes into account bandwidth constraints of the network without unduly restricting the communication of network telemetry metric information from the managed network.

In accordance with example implementations, the process includes receiving, by the network management system, the given message flow having the adjusted bandwidth to provide a received given message flow. The process includes imputing, by the network management system, content that is missing in the received given message flow corresponding to the difference between a bandwidth of the given message flow before the adjustment of the bandwidth and the adjusted bandwidth. A particular advantage is that anomalous network telemetry flows may be identified and throttled in an intelligent manner that takes into account bandwidth constraints of the network without unduly restricting the communication of network telemetry metric information from the managed network.

In accordance with example implementations, the subscription before modification allows the given network device to report the network telemetry metric responsive to a state of the network telemetry metric changing. Modifying the subscription includes constraining reporting of the network telemetry metric by the network device to a time window, which has a duration that corresponds to the adjusted bandwidth. A particular advantage is that anomalous network telemetry flows may be identified and throttled in an intelligent manner that takes into account bandwidth constraints of the network without unduly restricting the communication of network telemetry metric information from the managed network.

In accordance with example implementations, the process further includes, responsive to expiration of the time window, determining whether the given flow continues to exhibit an unexpected behavior. The process includes, responsive to expiration of the time window and responsive to determining that the given message flow continues to exhibit the unexpected behavior, constraining reporting of the network telemetry metric by the network device to another time window. A particular advantage is that anomalous network telemetry flows may be identified and throttled in an intelligent manner that takes into account bandwidth constraints of the network without unduly restricting the communication of network telemetry metric information from the managed network.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

monitoring, by a message rate tracking engine, a plurality of message flows sent by respective network devices of a plurality of network devices, wherein the plurality of message flows is associated with reporting a network telemetry metric to a network management system;

determining, by the message rate tracking engine, that a given message flow of the plurality of message flows exhibits an unexpected behavior; and responsive to determining that the given message flow exhibits the unexpected behavior:

determining, by a subscription management engine, an aggregate available bandwidth for message flows of the plurality of message flows, which respectively exhibit expected behaviors;

determining, by the subscription management engine, an adjusted bandwidth for the given message flow based on the aggregate available bandwidth; and modifying, by the subscription management engine, a subscription of the given network device to the network management system based on the adjusted bandwidth.

2. The method of claim 1, wherein determining that the given message flow exhibits the unexpected behavior comprises comparing a message rate of the given message flow with a message rate threshold.

3. The method of claim 2, further comprising determining message rate threshold, wherein determining the message rate threshold comprises applying a baselining algorithm to a plurality of message rates associated with the network telemetry metric and associated with a plurality of network devices of a local network that contains the given network device.

4. The method of claim 2, further comprising determining message rate threshold, wherein determining the message rate threshold comprises applying a baselining algorithm to a plurality of message rates associated with the network telemetry metric and associated with a plurality of network devices located in at least one other local network than a local network that contains the given network device.

5. The method of claim 2, wherein a second network device of the plurality of network devices sends messages of a network telemetry message flow pursuant to a periodic subscription interval, the method further comprising:

responsive to determining that the given message flow exhibits the unexpected behavior, modifying a subscription of a second network device of the plurality of network devices to increase a periodic subscription interval at which the second network device sends messages of the respective message flow.

6. The method of claim 1, further comprising:

responsive to determining that the given message flow exhibits the unexpected behavior, modifying, by the subscription manager, a second subscription of a periodic message flow associated with reporting a second network telemetry metric to the network management system, wherein modifying the second subscription comprises increasing a period of the periodic subscription from a first reporting time interval to a second time reporting interval to decrease a bandwidth of the periodic message flow.

7. The method of claim 6, further comprising:

receiving, by the network management system, the periodic message flow corresponding to the second reporting time interval to provide a received periodic message flow; and imputing, by the network management system, content missing in the received periodic message flow corresponding to the difference between the first reporting time interval and the second reporting time interval.

8. The method of claim 6, wherein:

the received periodic message flow comprises first samples of a network telemetry statistic;

the imputing comprises estimating additional second samples of the network telemetry statistic corresponding to the difference between the first reporting time interval and the second reporting time interval.

9. The method of claim 1, further comprising:

receiving, by the network management system, the given message flow having the adjusted bandwidth to provide a received given message flow; and imputing, by the network management system, content missing in the received given message flow corresponding to the difference between a bandwidth of the given message flow before the adjustment of the bandwidth and the adjusted bandwidth.

10. The method of claim 1, wherein the subscription before modification allows the given network device to report the network telemetry metric responsive to a state of the network telemetry metric changing, and modifying the subscription comprises constraining reporting of the network telemetry metric by the network device to a time window having a duration that corresponds to the adjusted bandwidth.

11. The method of claim 10, further comprising responsive to expiration of the time window:

determining whether the given message flow continues to exhibit an unexpected behavior; and responsive to determining that the given message flow continues to exhibit the unexpected behavior, constraining reporting of the network telemetry metric by the network device to another time window.

* * * * *